United States Patent
Smirnova et al.

(10) Patent No.: US 11,297,504 B2
(45) Date of Patent: Apr. 5, 2022

(54) PROVISIONING AND SERVICING MESH NETWORKS

(71) Applicant: Lennox Industries Inc., Richardson, TX (US)

(72) Inventors: Elena Smirnova, Plano, TX (US); Frank Xu, Plano, TX (US)

(73) Assignee: LENNOX INDUSTRIES INC., Richardson, TX (US)

( * ) Notice: Subject to any disclaimer, the term of this patent is extended or adjusted under 35 U.S.C. 154(b) by 119 days.

(21) Appl. No.: 16/865,513

(22) Filed: May 4, 2020

(65) Prior Publication Data
US 2021/0345100 A1 Nov. 4, 2021

(51) Int. Cl.
*H04W 12/30* (2021.01)
*H04W 4/50* (2018.01)
*H04L 41/0806* (2022.01)
*H04W 12/04* (2021.01)
*H04W 84/18* (2009.01)

(52) U.S. Cl.
CPC ......... *H04W 12/35* (2021.01); *H04L 41/0806* (2013.01); *H04W 4/50* (2018.02); *H04W 12/04* (2013.01); *H04W 84/18* (2013.01); *G05B 2219/2614* (2013.01)

(58) Field of Classification Search
CPC ....... H04W 12/35; H04W 4/50; H04W 12/04; H04W 84/18; H04L 41/0806; G05B 2219/2614
See application file for complete search history.

(56) References Cited

U.S. PATENT DOCUMENTS

| | | | |
|---|---|---|---|
| 2015/0372875 A1* | 12/2015 | Turon | H04W 84/20 370/254 |
| 2016/0088424 A1* | 3/2016 | Polo | H04W 4/80 455/41.1 |
| 2016/0330040 A1 | 11/2016 | Jeon et al. | |
| 2017/0364106 A1 | 12/2017 | Smith et al. | |
| 2020/0084620 A1* | 3/2020 | Jana | H04W 12/0431 |
| 2020/0097163 A1 | 3/2020 | Leonardi et al. | |
| 2020/0258335 A1* | 8/2020 | Davis | G07C 9/00309 |
| 2020/0379417 A1* | 12/2020 | Zhang | G06N 3/08 |

* cited by examiner

*Primary Examiner* — Magdi Elhag
(74) *Attorney, Agent, or Firm* — Shackelford, Bowen, McKinley & Norton, LLP

(57) ABSTRACT

In an embodiment, a method includes receiving a user instruction to initiate meshnet provisioning. The method also includes provisioning a first device to a meshnet, where the provisioning the first device yields first provisioning data that includes one or more keys. The method also includes provisioning a second device to the meshnet, where the provisioning the second device yields second provisioning data that includes include one or more keys. The method also includes transferring provisioning data that includes the first provisioning data and the second provisioning data to storage on the first device. Other embodiments of this aspect include corresponding computer systems, apparatus, and computer programs recorded on one or more computer storage devices, each configured to perform the actions of the method.

18 Claims, 5 Drawing Sheets

PROVISIONING AND SERVICING MESH NETWORKS

BACKGROUND

Technical Field

The present disclosure relates generally to heating, ventilation, and air conditioning (HVAC) systems and more particularly, but not by way of limitation, to systems and methods for provisioning and servicing mesh networks for HVAC systems.

History of Related Art

HVAC systems are used to regulate environmental conditions within an enclosed space. Typically, HVAC systems have a circulation fan that pulls air from the enclosed space through ducts and pushes the air back into the enclosed space through additional ducts after conditioning the air (e.g., heating, cooling, humidifying, or dehumidifying the air). More recently, HVAC systems are sometimes capable of network communication with various devices.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect involves a method that includes receiving a user instruction to initiate meshnet provisioning. The method also includes provisioning a first device to a meshnet, where the provisioning the first device yields first provisioning data that includes one or more keys. The method also includes provisioning a second device to the meshnet, where the provisioning the second device yields second provisioning data that includes include one or more keys. The method also includes transferring provisioning data that includes the first provisioning data and the second provisioning data to storage on the first device. Other embodiments of this aspect include corresponding computer systems, apparatus, and computer programs recorded on one or more computer storage devices, each configured to perform the actions of the method.

In an embodiment, another general aspect involves a method that includes receiving a user instruction to service a meshnet that includes a plurality of provisioned devices. The method also includes connecting to a first device of the plurality of provisioned devices via a first communication protocol, where the first device communicates in the meshnet via a wireless protocol different from the first communication protocol. The method also includes requesting provisioning data from the first device. The method also includes receiving the provisioning data from the first device responsive to the requesting, where the provision data includes one or more keys. The method also includes servicing the meshnet using the provisioning data. Other embodiments of this aspect include corresponding computer systems, apparatus, and computer programs recorded on one or more computer storage devices, each configured to perform the actions of the method.

In an embodiment, another general aspect involves a computer-program product that includes a non-transitory computer-usable medium having computer-readable program code embodied therein. The computer-readable program code is adapted to be executed to implement a method. The method includes receiving a user instruction to initiate meshnet provisioning. The method also includes provisioning a first device to a meshnet, where the provisioning the first device yields first provisioning data that includes one or more keys. The method also includes provisioning a second device to the meshnet, where the provisioning the second device yields second provisioning data that includes include one or more keys. The method also includes transferring provisioning data that includes the first provisioning data and the second provisioning data to storage on the first device. Other embodiments of this aspect include corresponding computer systems, apparatus, and computer programs recorded on one or more computer storage devices, each configured to perform the actions of the method.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
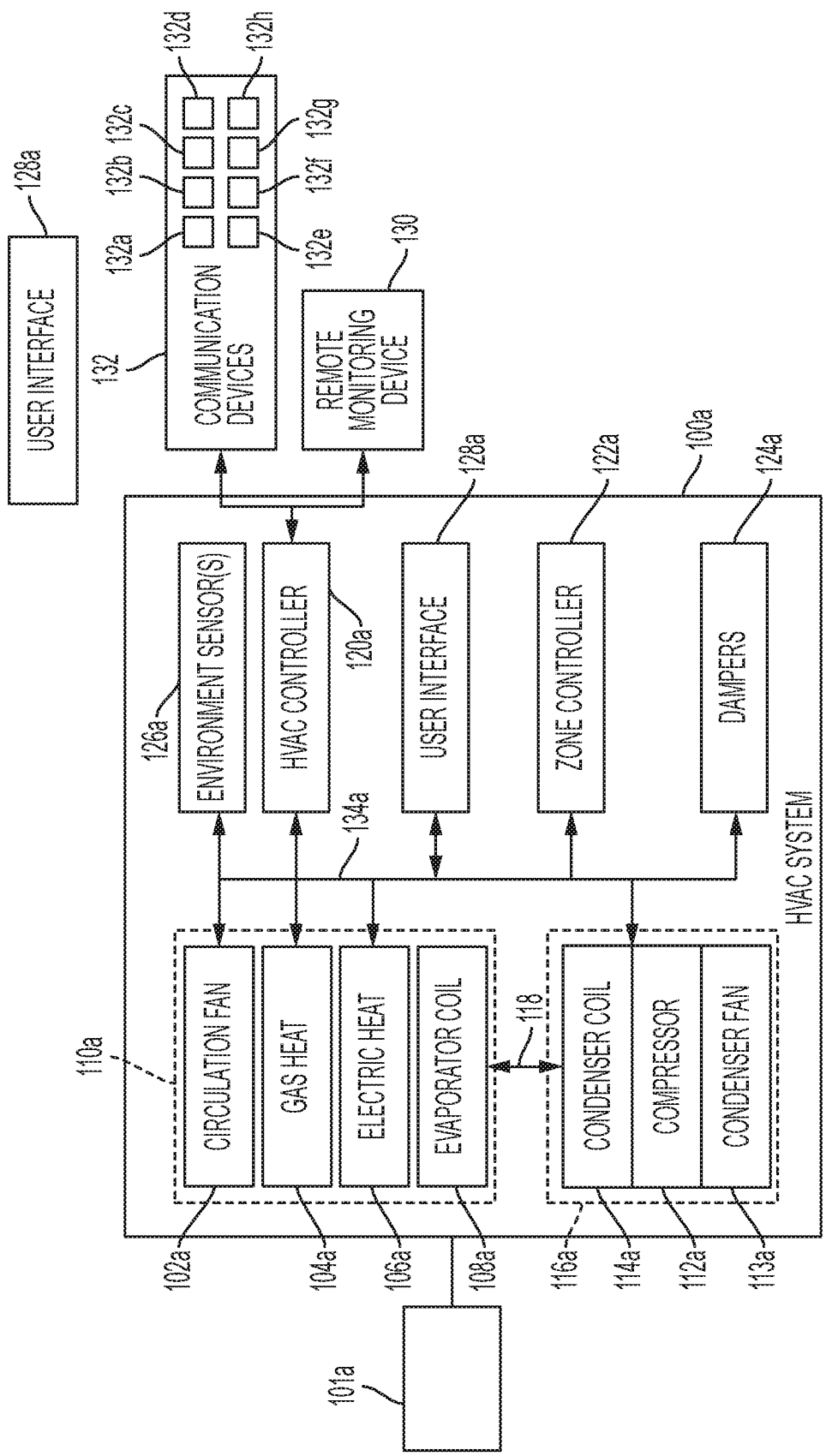
FIG. 1 is a block diagram of an illustrative heating, ventilation, and air conditioning (HVAC) system.

FIG. 1 illustrates a heating, ventilation and air conditioning (HVAC) system 100a. In a typical embodiment, the HVAC system 100a is a networked HVAC system configured to condition air via, for example, heating, cooling, humidifying, or dehumidifying. For illustration, the HVAC system 100a as illustrated in FIG. 1 includes various components; however, in other embodiments, the HVAC system 100a may include additional components that are not illustrated but typically included within HVAC systems. The HVAC system 100a can be a residential system or a commercial system such as, for example, a roof top system.

The HVAC system 100a includes a variable-speed circulation fan 102a, a gas heat 104a, electric heat 106a typically associated with the variable-speed circulation fan 102a, and a refrigerant evaporator coil 108a, also typically associated with the variable-speed circulation fan 102a. For illustrative purposes, only variable-speed circulation fan 102a is disclosed; however, in other embodiments, fixed speed and multi-speed circulation fans may be used as required. The variable-speed circulation fan 102a, the gas heat 104a, the electric heat 106a, and the refrigerant evaporator coil 108a are collectively referred to as an "indoor unit" 110a. In a typical embodiment, the indoor unit 110a is located within, or in close proximity to, an enclosed space 101a. The HVAC system 100a also includes a variable-speed compressor 112a, an associated condenser coil 114a, and a condenser fan 113a, which are typically referred to as an "outdoor unit" 116a. In a typical embodiment, the condenser fan 113a may be at least one of a fixed-speed condenser fan, a multi-speed condenser fan, and a variable-speed condenser fan. In various embodiments, the outdoor unit 116a is, for example, a rooftop unit or a ground-level unit. The variable-speed compressor 112a and the associated condenser coil 114a are connected to an associated evaporator coil 108a by a refrigerant line 118. In a typical embodiment, the variable-speed compressor 112a is, for example, a single-stage compressor, a multi-stage compressor, a single-speed compressor, or a variable-speed compressor. The variable-speed circulation fan 102a, sometimes referred to as an air blower, is configured to operate at different capacities (i.e., variable motor speeds) to circulate air through the HVAC system 100a, whereby the circulated air is conditioned and supplied to the enclosed space 101a. For illustrative purposes, only variable-speed compressor 112a is disclosed; however, in other embodiments, fixed speed and multi-stage compressors may be used as required.

Still referring to FIG. 1, the HVAC system 100a includes an HVAC controller 120a that is configured to control operation of the various components of the HVAC system 100a such as, for example, the variable-speed circulation fan 102a, the gas heat 104a, the electric heat 106a, the variable-speed compressor 112a, and the condenser fan 113a. In some embodiments, the HVAC system 100a can be a zoned system. In such embodiments, the HVAC system 100a includes a zone controller 122a and dampers 124a. In a typical embodiment, the HVAC controller 120a cooperates with the zone controller 122a and the dampers 124a to regulate the environment of the enclosed space 101a.

The HVAC controller 120a may be an integrated controller or a distributed controller that directs operation of the HVAC system 100a. In a typical embodiment, the HVAC controller 120a includes an interface to receive, for example, thermostat calls, component health data, temperature setpoints, air blower control signals, environmental conditions, and operating mode status for various zones of the HVAC system 100a. In a typical embodiment, the HVAC controller 120a also includes a processor and a memory to direct operation of the HVAC system 100a including, for example, a speed of the variable-speed circulation fan 102a.

The HVAC controller 120a may be associated with, or communicably coupled to, a plurality of environment sensors 126a. The plurality of environment sensors 126a can include, for example, sensors for measuring temperature, humidity, combinations of the foregoing and/or the like. In some embodiments, the environment sensors 126a can be distributed throughout, or located within, the enclosed space 101a. In various embodiments, the HVAC controller 120a, along with the plurality of environment sensors 126a, can be provisioned into a mesh network (hereinafter "meshnet"). In these embodiments, the HVAC controller 120a can communicate with the plurality of environment sensors 126a via the meshnet and act based thereon. Operability of the HVAC system 100a and the plurality of environment sensors 126a to be provisioned into, and communicate via, a meshnet, will be described in greater detail with respect to FIGS. 2-5.

Still referring to FIG. 1, in some embodiments, the HVAC controller 120a is optionally associated with a user interface 128a. In some embodiments, the user interface 128a provides additional functions such as, for example, operational, diagnostic, status message display, and a visual interface that allows at least one of an installer, a user, a support entity, and a service provider to perform actions with respect to the HVAC system 100a. In some embodiments, the user interface 128a is, for example, a thermostat of the HVAC system 100a. In other embodiments, the user interface 128a is associated with at least one sensor of the plurality of environment sensors 126a to determine the environmental condition information and communicate that information to the user. The user interface 128a may also include a display, buttons, a microphone, a speaker, or other components to communicate with the user. Additionally, the user interface 128a may include a processor and memory that is configured to receive user-determined parameters, and calculate operational parameters of the HVAC system 100a as disclosed herein.

In a typical embodiment, the HVAC system 100a is configured to communicate with a plurality of devices such as, for example, a monitoring device 130, communication devices 132, and the like. In a typical embodiment, the monitoring device 130 is not part of the HVAC system 100a. For example, the monitoring device 130 is a server or computer of a third party such as, for example, a manufacturer, a support entity, a service provider, and the like. In other embodiments, the monitoring device 130 is located at an office of, for example, the manufacturer, the support entity, the service provider, and the like.

In a typical embodiment, the communication devices 132 are non-HVAC devices having a primary function that is not associated with HVAC systems. In some embodiments, non-HVAC devices include mobile-computing devices that are configured to interact with the HVAC system 100a to monitor and modify at least some of the operating parameters of the HVAC system 100a. Mobile computing devices may be, for example, a personal computer (e.g., desktop or laptop), a tablet computer, a mobile device (e.g., smart phone), and the like.

In an example, in certain embodiments, one or more of the communication devices 132 can be used to connect to the HVAC controller 120a for purposes of provisioning devices into a meshnet or servicing such meshnet. As described previously, the meshnet can include, for example, the HVAC controller 120a, some or all of the plurality of environment sensors 126a, and/or other devices or components. An example of using one or more of the communication devices to provision or service the meshnet will be described relative to FIGS. 2-5.

In addition, or alternatively, the communication devices 132 can include non-HVAC devices that are configured to interact with the HVAC system 100a such that their operation can be controlled by the HVAC system 100a. According to exemplary embodiments, the non-HVAC devices may be devices whose operation can be controlled via the controller 120a of the HVAC system 100a such as, for example, ceiling fans 132a, 132b, 132c, exhaust fans 132d, 132e, 132f, smoke detectors 132g, 132h, and the like. In a typical embodiment, the communications devices 132 such as, for example, the ceiling fans 132a, 132b, 132c, the exhaust fans 132d, 132e, 132f, and the smoke detectors 132g, 132h are configured to communicate with the HVAC controller 120a.

In some embodiments, the data bus 134a may couple the HVAC controller 120a, for example, to the communication devices 132 and/or the plurality of environment sensors 126a. For example, a wireless connection can be employed to provide at least some of the connections between the HVAC controller 120a and the communication devices 132 and between the HVAC controller 120a and the plurality of environment sensors 126a. In a typical embodiment, the communication devices 132 include at least one processor, memory and a user interface, such as a display. One skilled in the art will also understand that the communication devices 132 disclosed herein include other components that are typically included in such devices including, for example, a power supply, a communications interface, and the like.

The zone controller 122a is configured to manage movement of conditioned air to designated zones of the enclosed space. Each of the designated zones include at least one conditioning or demand unit such as, for example, the gas heat 104a and at least one user interface 128a such as, for example, the thermostat. The zone-controlled HVAC system 100a allows the user to independently control the temperature in the designated zones. In a typical embodiment, the zone controller 122a operates electronic dampers 124a to control air flow to the zones of the enclosed space.

In some embodiments, a data bus 134a couples various components of the HVAC system 100a together such that data is communicated therebetween. In a typical embodiment, the data bus 134a may include, for example, any combination of hardware, software embedded in a computer readable medium, or encoded logic incorporated in hardware or otherwise stored (e.g., firmware) to couple components of the HVAC system 100a to each other. As an example and not by way of limitation, the data bus 134a may include a serial bus, an Accelerated Graphics Port (AGP) or other graphics bus, a Controller Area Network (CAN) bus, a front-side bus (FSB), a HYPERTRANSPORT (FIT) interconnect, an INFINIBAND interconnect, a low-pin-count (LPC) bus, a memory bus, a Micro Channel Architecture (MCA) bus, a Peripheral Component interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus 134a may include any number, type, or configuration of data buses 134a, where appropriate. In particular embodiments, one or more data buses 134a (which may each include an address bus and a data bus) may couple the HVAC controller 120a to other components of the HVAC system 100a. In other embodiments, connections between various components of the HVAC system 100a are wired. For example, conventional cable and contacts may be used to couple the HVAC controller 120a to the various components.

In some embodiments, the data bus 134a includes wireless connections of different types for different devices and components. For example, a wireless connection can be employed for connections between the HVAC controller 120a and the plurality of communication devices 132. In another example, a wireless connection can be employed for connections between the HVAC controller 120a and the plurality of environment sensors 126a. In various embodiments, such wireless connections can conform to various wireless specifications and standards such as, for example, IEEE 802.11, BLUETOOTH specifications (e.g., BLUETOOTH, BLUETOOTH Low Energy (BLE), BLUETOOTH mesh networking, etc.) variations or extensions of the foregoing, combinations of the foregoing, and/or the like.

Figure 2:
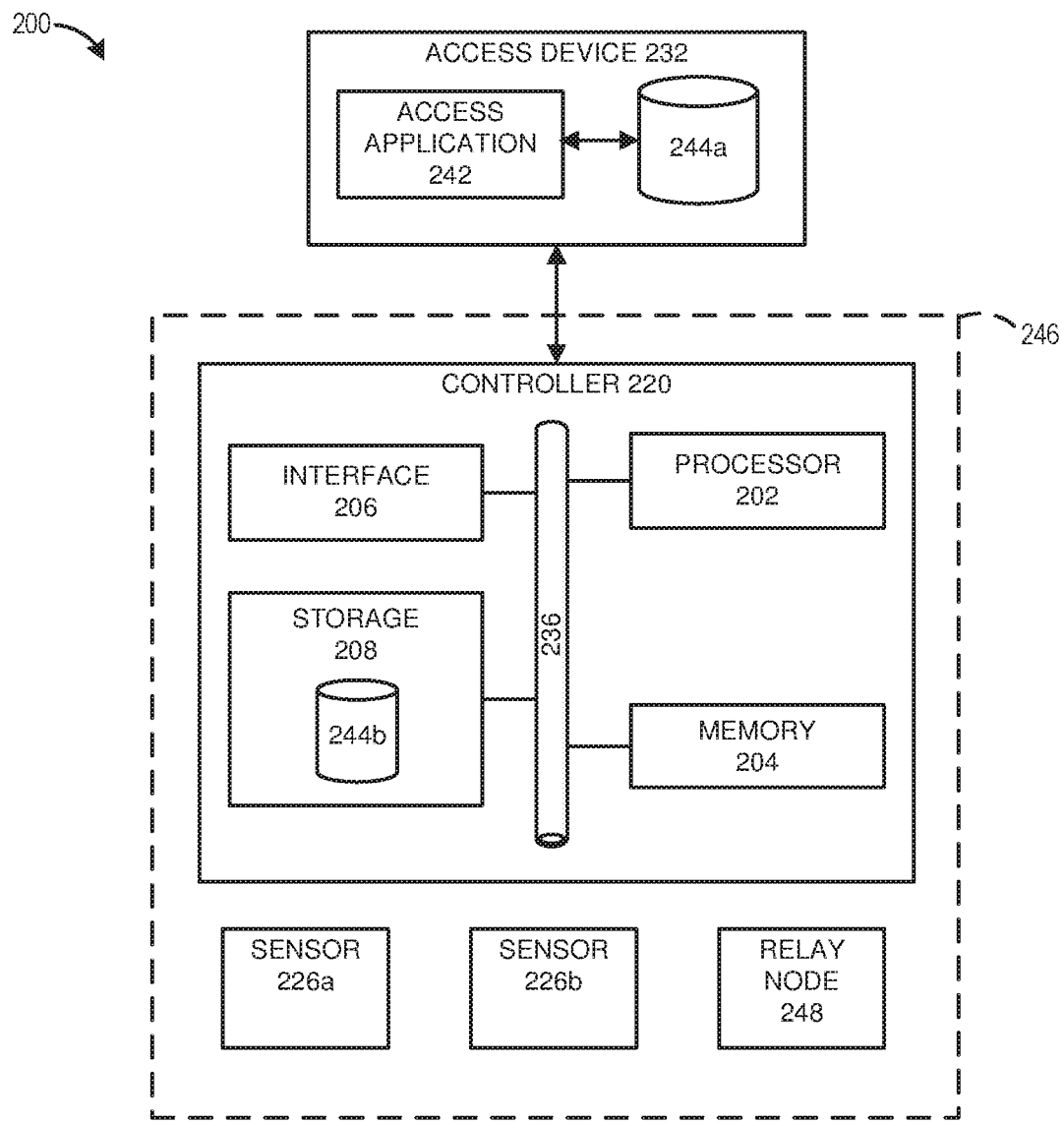
FIG. 2 illustrates an example of a system for provisioning and servicing meshnets for HVAC systems.

FIG. 2 illustrates an example of a system 200 for provisioning and servicing meshnets for HVAC systems. The system 200 includes an access device 232, an HVAC controller 220, environment sensors 226a and 226b, and a relay node 248. In general, the access device 232 can operate as described relative to any of the communication devices 132 of FIG. 1. In similar fashion, the HVAC controller 220 and the environment sensors 226a and 226b can operate as generally described relative to the HVAC controller 120a and the environment sensors 126a, respectively, of FIG. 1.

As described in greater detail below, the access device 232 can be used to establish, provision devices into, and/or service a meshnet 246. The meshnet 246 can include, for example, the HVAC controller 720, the environment sensors 226a and 226b and the relay node 248.

The access device 232 includes an access application 242 resident and executing thereon. In a typical embodiment, the access application 242 is representative of any software application that can control the access device 232 to communicate with other devices, for example, to establish, provision devices into, and/or service the meshnet 246. In certain embodiments, the access application 242 can be a platform-specific native application for the access device 232. As described in greater detail below, the access application 242 is operable to communicate with the HVAC controller 220 to establish, update, locally store and/or transfer provisioning data 244a. The provisioning data 244a can be stored, for example, in volatile or non-volatile memory on the access device 232. In some cases, the provisioning data 244a can be maintained in temporary memory, for example, until an applicable provisioning process has concluded.

In the example of FIG. 2, the HVAC controller 220 may comprise any suitable physical form, configuration, number, type and/or layout. In the depicted embodiment, the HVAC controller 220 includes a processor 202, memory 204, storage 208, interface 206, and bus 236. Although a particular HVAC controller is depicted having a particular number of particular components in a particular arrangement, this disclosure contemplates any suitable HVAC controller having any suitable number of any suitable components in any suitable arrangement.

Processor 202 may be a microprocessor, controller, or any other suitable computing device, resource, or combination of hardware, software and/or encoded logic operable to execute, either alone or in conjunction with other components (e.g., memory 204). Such functionality may include providing various features discussed herein. In particular embodiments, processor 202 may include hardware for executing instructions. As an example and not by way of limitation, to execute instructions, processor 202 may retrieve (or fetch) instructions from an internal register, an internal cache, memory 204, or storage 208; decode and execute them; and then write one or more results to an internal register, an internal cache, memory 204, or storage 208.

In particular embodiments, processor 202 may include one or more internal caches for data, instructions, or addresses. This disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 208 and the instruction caches may speed up retrieval of those instructions by processor 202. Data in the data caches may be copies of data in memory 204 or storage 208 for instructions executing at processor 202 to operate on; the results of previous instructions executed at processor 202 for access by subsequent instructions executing at processor 202, or for writing to memory 204, or storage 208; or other suitable data. The data caches may speed up read or write operations by processor 202. The TLBs may speed up virtual-address translations for processor 202. In particular embodiments, processor 202 may include one or more internal registers for data, instructions, or addresses.

Depending on the embodiment, processor 202 may include any suitable number of any suitable internal registers, where appropriate. Where appropriate, processor 202 may include one or more arithmetic logic units (ALUs); be a multi-core processor; include one or more processors 202; or any other suitable processor.

Memory 204 may be any form of volatile or non-volatile memory including, without limitation, magnetic media, optical media, random access memory (RAM), read-only memory (ROM), flash memory, removable media, or any other suitable local or remote memory component or components. In particular embodiments, memory 204 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 204 may include one or more memories 204, where appropriate. Memory 204 may store any suitable data or information utilized by the HVAC controller 220, including software embedded in a computer readable medium, and/or encoded logic incorporated in hardware or otherwise stored (e.g., firmware). In particular embodiments, memory 204 may include main memory for storing instructions for processor 202 to execute or data for processor 202 to operate on. In particular embodiments, one or more memory management units (MMUs) may reside between processor 202 and memory 204 and facilitate accesses to memory 204 requested by processor 202.

As an example and not by way of limitation, the HVAC controller 220 may load instructions from storage 208 or another source (such as, for example, another computer system) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 may execute only instructions in one or more internal registers or internal caches or in memory 204 (as opposed to storage 208 or elsewhere) and may operate only on data in one or more internal registers or internal caches or in memory 204 (as opposed to storage 208 or elsewhere).

In particular embodiments, storage 208 may include mass storage for data or instructions. As an example and not by way of limitation, storage 208 may include a hard disk drive (HDD), a floppy disk drive, flash memory, an optical disc, a magneto-optical disc, magnetic tape, or a Universal Serial Bus (USB) drive or a combination of two or more of these. Storage 208 may include removable or non-removable (or fixed) media, where appropriate. Storage 208 may be internal or external to the HVAC controller 220, where appropriate. In particular embodiments, storage 208 may be non-volatile, solid-state memory. In particular embodiments, storage 208 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 208 may take any suitable physical form and may comprise any suitable number or type of storage. Storage 208 may include one or more storage control units facilitating communication between processor 202 and storage 208, where appropriate.

In particular embodiments, interface 206 may include hardware, encoded software, or both providing one or more interfaces for communication (such as, for example, packet-based communication) among any networks, any network devices, and/or any other computer systems. As an example and not by way of limitation, communication interface 206 may include a network interface controller (NIC) or network adapter for communicating with an Ethernet or other wire-based network and/or a wireless NIC (WNIC) or wireless adapter for communicating with a wireless network.

Depending on the embodiment, interface 206 may be any type of interface suitable for any type of network for which HVAC controller 220 is used. As an example and not by way of limitation, HVAC controller 220 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, HVAC controller 220 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The HVAC controller 220 may include any suitable interface 206 for any one or more of these networks, where appropriate.

In some embodiments, interface 206 may include one or more interfaces for one or more I/O devices. One or more of these I/O devices may enable communication between a person and the HVAC controller 220. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 206 for them. Where appropriate, interface 206 may include one or more drivers enabling processor 202 to drive one or more of these I/O devices, interface 206 may include one or more interfaces 206, where appropriate.

Bus 236 may include any combination of hardware, software embedded in a computer readable medium, and/or encoded logic incorporated in hardware or otherwise stored (e.g., firmware) to couple components of the HVAC controller 220 to each other. As an example and not by way of limitation, bus 236 may include any of the example buses described above relative to the bus 134a of FIG. 1, or any other suitable bus or a combination of two or more of these. Bus 236 may include any number, type, and/or configuration of buses 236, where appropriate. In particular embodiments, one or more buses 236 (which may each include an address bus and a data bus) may couple processor 202 to memory 204. Bus 236 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL, drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 202 (such as, for example, one or more internal registers or caches), one or more portions of memory 204, one or more portions of storage 208, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In general, the environment sensors 226a and 226b can be, for example, sensors that measure temperature, humidity, and/or other parameters within an enclosed space such as the enclosed space 101a of FIG. 1. In various embodiments, the environment sensors 226a and 226b can be relatively distant from the HVAC controller 220. In such embodiments, the relay node 248 can be used to relay messages between the HVAC controller 220 and the environment sensors 226a and 226b. The environment sensors 226a and 226b and the relay node 248 are shown in FIG. 2 as illustrative examples. It should be appreciated that the number and type of sensors can be varied to suit a given implementation. In similar fashion, a number of relay nodes can be varied in accordance with a given distribution of sensors and/or respective distances of such sensors from an HVAC controller such as the HVAC controller 220.

In certain embodiments, the HVAC controller 220 can communicate via multiple communication protocols. For example, the HVAC controller 220 can communicate with the access device 232 via a first communication protocol and with devices or systems that may join the meshnet 246, such as the environment sensors 226a and 226b and the relay node 248, via a second communication protocol. The first communication protocol, which is used with the access device 232, can be, for example, a wired communication protocol, a wireless communication protocol such as BLUETOOTH, and/or the like. In an example, the first communication protocol can correspond to Generic Attribute Profile (GATT) protocol of BLE. In another example, the first communication protocol can correspond to Direct. In other examples, the first communication protocol can correspond to other types of wired or wireless communication. For illustrative purposes, an example of how the access device 232 can connect to, or pair with, the HVAC controller 220 will be described with respect to FIG. 3.

In certain embodiments, the second communication protocol of the HVAC controller 220, which can be used with devices that may join the meshnet 246, can correspond to a wireless meshnet standard or specification. Generally speaking, the second communication protocol enables nodes of the meshnet 246 to connect directly, dynamically and non-hierarchically to each other and cooperate with one another to efficiently route data therebetween. For illustrative purposes, examples will be described herein using BLUETOOTH mesh networking. For clarity, such example descriptions may be presented using terminology consistent with BLUETOOTH mesh networking. It should be appreciated, however, that any suitable wireless meshnet standard or specification can be utilized in various implementations without deviating from the principles disclosed herein.

In operation, the access application 242 of the access device 732 can control the access device 232 to execute a process for establishing, and provisioning devices into, the meshnet 246. In various embodiments, the access device 232 connects to each device that is to be provisioned and appropriately provisions the device into the meshnet 246. These devices can include, for example, the HVAC controller 220, the environment sensors 226a and 226b and the relay node 248. The HVAC controller 220, for example, can be provisioned as a proxy node in the meshnet 246. The access device 232 can connect to each device being provisioned using any suitable networking or communication method. In many cases, the method can be specific to a wireless meshnet standard or specification, if any, corresponding to the second communication protocol described above.

In a typical embodiment, the above-described provisioning process results in the provisioning data 244a being generated. In various cases, the provisioning data 244a can be generated by the access device 232 in combination with the devices provisioned into the meshnet 246 (e.g., the HVAC controller 220, the environment sensors 226a and 226b and the relay node 248). The provisioning data 244a is typically protocol-specific and can include, for example, a network key for the meshnet 246, device keys for the provisioned devices, security parameters, addresses assigned to the provisioned devices, combinations of the foregoing and/or the like. The provisioning data 244a can be represented, for example, in a database, data structure, flat file, and/or the like. In various implementations, the provisioning data 244a, in whole or in part, may be necessary to service the meshnet 246 at a later time. Meshnet servicing can involve, for example, adding or removing devices from the meshnet 246 and/or other modifications or re-configurations.

In certain embodiments, the access device 232 can facilitate later servicing of the meshnet 246 by transferring the provisioning data 244a to the HVAC controller 220 after provisioning is complete. In particular, the provisioning data 244b shown in the storage 208 of the HVAC controller 220 illustrates an example result of such a transfer. In that way, the provisioning data 244b is persistently stored on the HVAC controller 220. Advantageously, in various embodiments, the provisioning data 244b enables the meshnet 246 to be serviced by different devices, potentially operated by different users, without having to rely upon the provisioning data 244a being shared via an out-of-band method such as cloud storage, user-to-user sharing, or the like. Rather, another device configured similarly to the access device 232 can connect to the HVAC controller 220 via the first communication protocol described above, retrieve the provisioning data 244b from the storage 208, locally store the provisioning data 244b as the provisioning data 244a, and service the meshnet 246. An example of a process for initial meshnet provisioning will be described with respect to FIG. 4. An example of meshnet servicing following the initial meshnet provisioning will be described with respect to FIG. 5.

Figure 3:
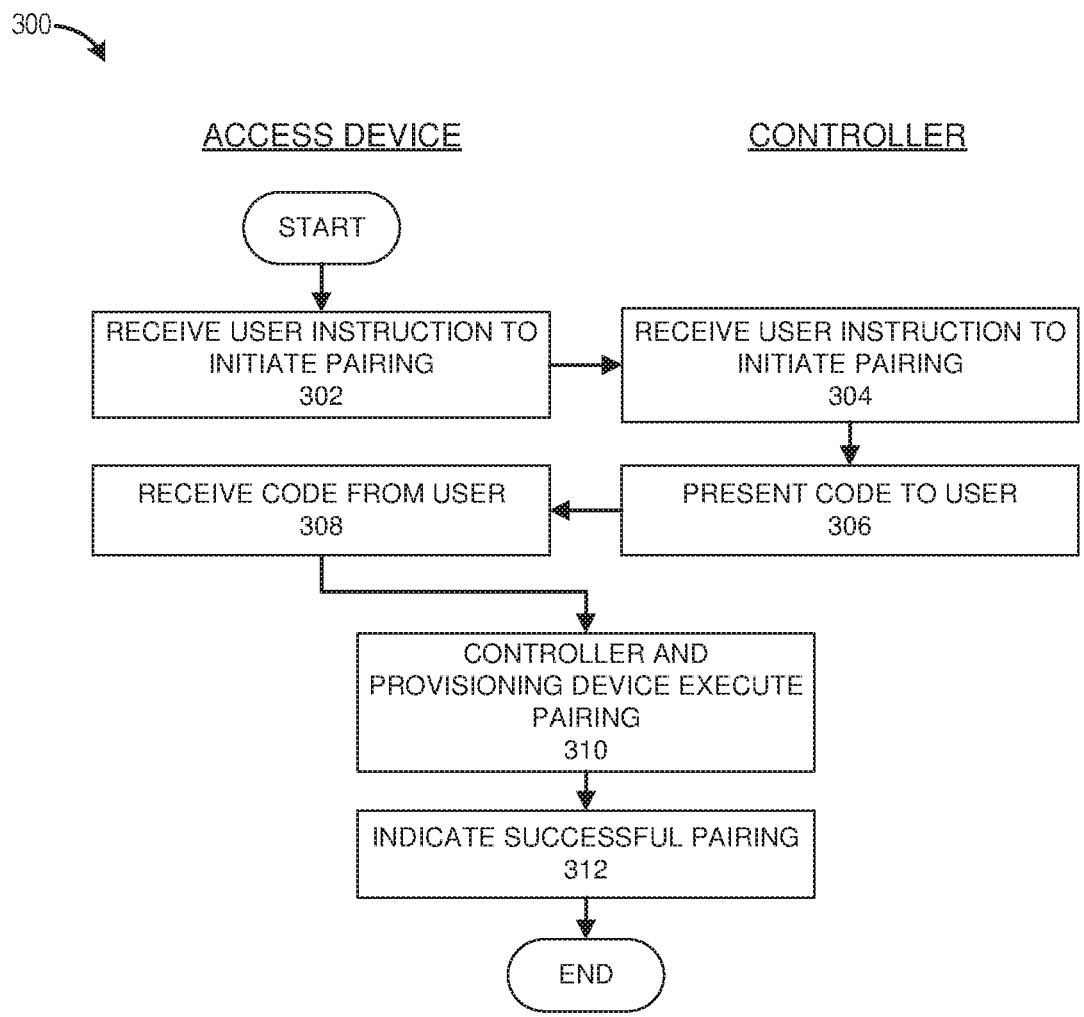
FIG. 3 illustrates an example of a process for an access device to connect to an HVAC controller.

FIG. 3 illustrates an example of a process 300 for an access device to connect to an HVAC controller. In various embodiments, the process 300 can be executed with respect to any two devices operable to communicate wirelessly.

Although any number of systems or components can execute the process 300, for simplicity of description, the process 300 will be described relative to the access device 232 and the HVAC controller 220 of FIG. 2. In a typical embodiment, the access application 242 of the access device 232 can direct the flow of the process 300 via user-interface options and prompts. In this way, functionality attributed to the access device 232 can be controlled or caused by the access application 242. In various embodiments, communication performed during the process 300 can correspond, and conform to, the first communication protocol described above with respect to FIG. 2.

At block 302, the access device 232 receives a user instruction to initiate device pairing. The user instruction can be received, for example, as a result of a user of the access device 232 opening the access application 242 and selecting a hardware or software interface option to initiate pairing. At block 304, the HVAC controller 220 receives a user instruction to initiate device pairing. The user instruction received by the HVAC controller 220 can be received, for example, via user selection of a hardware or software interface option for initiating pairing. In some embodiments, the user instruction can be received as a result of the user pressing a physical pairing button on the HVAC controller 220.

At block 306, the HVAC controller 220 presents a security code to the user via, for example, a display thereon. The security code can include, for example, a given number of digits and/or characters (e.g., 4, 8, etc.). At block 308, the access device 232 receives the security, code from the user via, for example, user entry of the security code in the access application 242. At block 310, the access device 232 and the HVAC controller 220 communicate to execute pairing. The communication and exchange of information that occurs at the block 310 can be protocol-specific in correspondence to the above-described first communication protocol of the HVAC controller 220. For example, in some implementations, the access device 232 and the HVAC controller 220 can pair according to the GATT protocol of BLE.

At block 312, the access device 232 and/or the HVAC controller 220 can indicate successful pairing via any appropriate audio or visual notification. For example, in some embodiments, the access device 232 can visually indicate successful pairing via a notification within the access application 242. By way of further example, in some embodiments, the HVAC controller 220 can indicate successful pairing via a notification in a display thereon. In various embodiments, although not specifically illustrated in FIG. 3, unsuccessful pairing can be similarly indicated via any appropriate audio or visual notification. After block 312, the process 300 ends.

Figure 4:
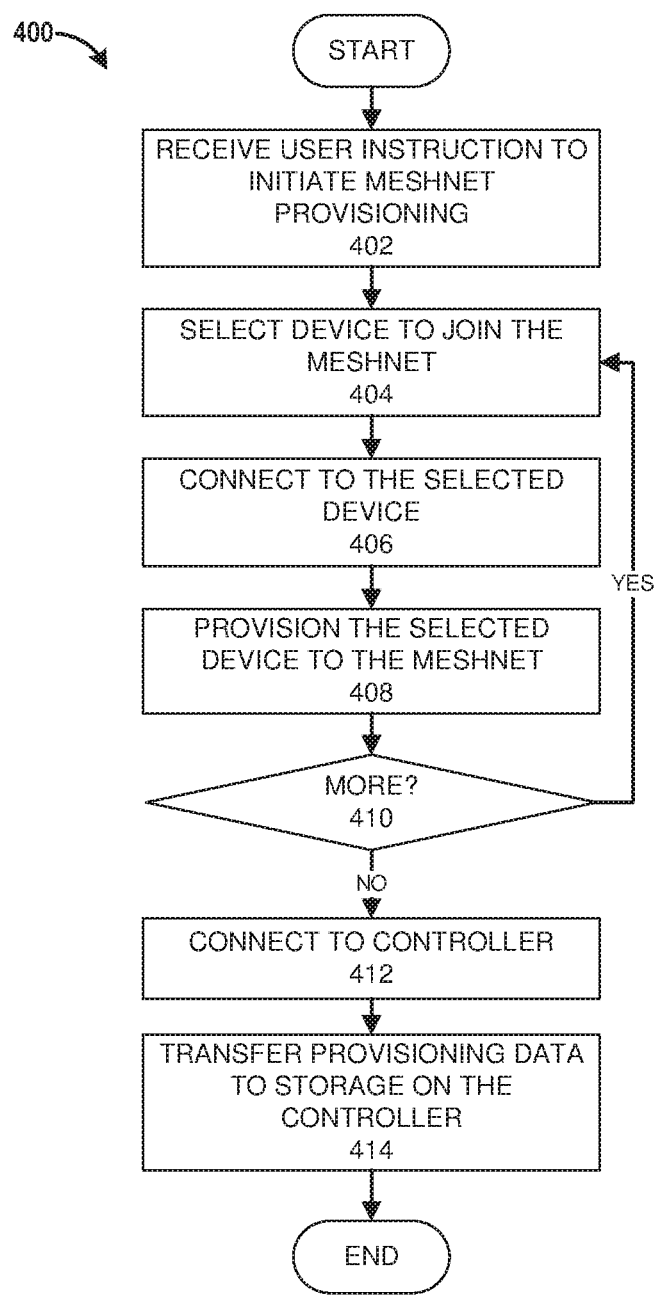
FIG. 4 illustrates an example of a process for initial meshnet provision.

FIG. 4 illustrates an example of a process 400 for initial meshnet provisioning. In various embodiments, the process 400 can be executed by any device operable to communicate wirelessly. Although any number of systems or components can execute the process 400, for simplicity of description, the process 400 will be described relative to the access device 232 and the HVAC controller 220 of FIG. 2. In a typical embodiment, the access application 242 of the access device 232 can direct the flow of the process 400 via user-interface options and prompts. In this way, functionality attributed to the access device 232 can be controlled or caused by the access application 242.

At block 402, the access device 232 receives a user instruction to initiate meshnet provisioning. The user instruction can be received, for example, as a result of a user of the access device 232 opening the access application 242 and selecting a hardware or software interface option to initiate the meshnet provisioning.

At block 404, the access device 232 selects a device to join the meshnet 246. In certain embodiments, the device can be selected in response to indications made by a user in the access application 242. The device can include, for example, a device visible to the access device 232 via any appropriate communication protocol. With reference to FIG. 2, the selected device can be, for example, the HVAC controller 220, the environment sensors 226a and 226b and/or the relay node 248. In some embodiments, the block 404 can be combined, for example, with block 406 (described below such that the selection is defined by the device to which the access device 232 connects.

At block 406, the access device 232 connects to the selected device. In an example, the access device 232 can connect to the selected device in peer-to-peer fashion using any wired or wireless communication protocol or method, such as any of the protocols or methods described previously relative to FIGS. 1-3. At block 408, the access device 232 provisions the selected device to the meshnet 246. As described previously relative to FIG. 2, the provisioning at the block 408 can be protocol-specific. In general, each iteration through the block 408 can result in the provisioning data 244a being progressively generated. For example, if the selected device is the HVAC controller 220, the block 408 can include the access device 232 provisioning the HVAC controller 220 to the meshnet 246 as a proxy node in the meshnet 246. In similar fashion, if the selected device is one of the environment sensors 226a and 226b or the relay node 248, the block 408 can involve appropriately provisioning such device to the meshnet 246.

At decision block 410, it is determined whether additional devices are to be provisioned to the meshnet 246. If so, the process 400 returns to the block 404 and executes as described previously. It should be appreciated that devices can be provisioned in any suitable order. In many cases, a user of the access device 232 may move or relocate the access device 232 throughout an enclosed space, such as the enclosed space 101a of FIG. 1, for purposes of establishing connections for provisioning. If it is determined at the decision block 410 that no additional devices are to be provisioned to the meshnet 246, the process 400 proceeds to block 412.

At block 412, the access device 232 connects to the HVAC controller 220. The access device 232 can connect to the HVAC controller 220 in any suitable fashion. In an example, the connection can be established using the first communication protocol described above relative to FIG. 2. In some embodiments, the block 412 can involve the access device 232 and the HVAC controller 220 executing the process 300 of FIG. 3 in whole or in part. In some cases, such as situations in which the access device 232 is already suitably connected to the HVAC controller 220, the block 412 may be omitted.

At block 414, the access device 232 transfers the provisioning data 244a to the HVAC controller 220 for persistent storage. In a typical embodiment, the block 414 involves the HVAC controller 220 storing the provisioning data 244a, as the provisioning data 244b, in the storage 208. After block 414, the process 400 ends.

Figure 5:
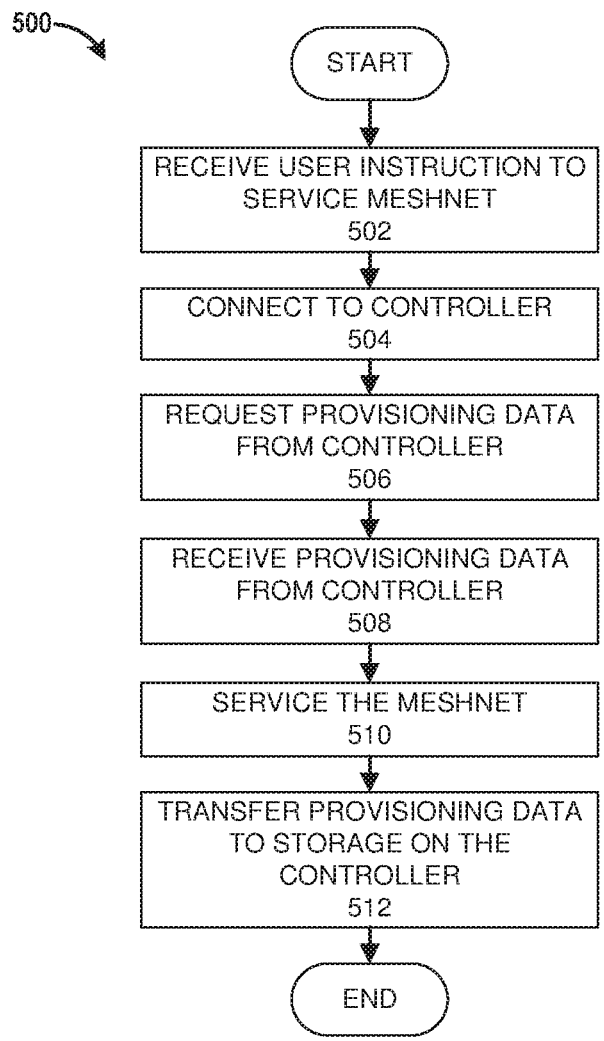
FIG. 5 illustrates an example of a process for meshnet servicing.

FIG. 5 illustrates an example of a process 500 for meshnet servicing. In various embodiments, the process 500 can be performed at any point after completion of an initial meshnet provisioning process, such as the process 400 of FIG. 4. In general, the process 500 can be executed by any device operable to communicate wirelessly. Although any number of systems or components can execute the process 500, for simplicity of description, the process 500 will be described relative to the access device 232 and the HVAC controller 220 of FIG. 2. In a typical embodiment, the access application 242 of the access device 232 can direct the flow of the process 500 via user-interface options and prompts. In this way, functionality attributed to the access device 232 can be controlled or caused by the access application 242.

At block 502, the access device 232 receives a user instruction to perform meshnet servicing. The user instruction can be received, for example, as a result of a user of the access device 232 opening the access application 242 and selecting a hardware or software interface option to initiate the meshnet servicing. At block 504, the access device 232 connects to the HVAC controller 220 using, for example, the first communication protocol as described above relative to FIG. 2. In various embodiments, the access device 232 can connect to the HVAC controller 220 using wired or wireless communication. For example, in some implementations, the block 504 can involve the access device 232 and the HVAC controller 220 executing the process 300 of FIG. 3 in whole or in part.

At block 506, the access device 232 requests the provisioning data 244b from the storage 208 on the HVAC controller 220. At block 508, the access device 232 receives the provisioning data 244b from the HVAC controller 220. In a typical embodiment, the block 508 results in a local copy of the provisioning data 244b on the access device 232, where the local copy is represented as the provisioning data 244a.

At block 510, the access device 232 services the meshnet 246, for example, in response to user interaction with the access application 242. Meshnet servicing can involve, for example, adding or removing devices from the meshnet 246 and/or other modifications or re-configurations. In general, the servicing involves using the provisioning data 244a. In various embodiments, the meshnet servicing can result in the access device 232 performing operations similar to the operations described relative to the process 400 of FIG. 4. In some embodiments, the meshnet servicing can result in the changes or updates to the provisioning data 244a.

At block 512, the access device 232 transfers the provisioning data 244a, potentially as updated at the block 510, to the HVAC controller 220 for persistent storage. In a typical embodiment, the block 512 involves the HVAC controller 220 storing the provisioning data 244a, as the provisioning data 244b, in the storage 208. If the access device 232 is not already, connected to the HVAC controller 220, the access device 232 can connect to the HVAC controller 220 in any suitable fashion (e.g., using the process 300 of FIG. 3). In some implementations, if the block 510 results in no changes to the provisioning data 244a, the block 512 can be omitted. After block 512, the process 500 ends.

Although the processes 400 and 500 of FIGS. 4 and 5, respectively, are each described generically relative to the access device 232, it should be appreciated that, in various embodiments, these processes can be executed by different devices operated by different users. Stated somewhat differently, an access device performing initial meshnet provisioning according to the process 400 of FIG. 4 may be considered a provisioning device, an access device performing meshnet servicing according to the process 500 of FIG. 5 may be considered a servicing device, and the provisioning device and the servicing device need not be the same device or be operated by the same users. Rather, the provisioning and servicing devices can each be similarly configured with an access application such as the access application 242, where each access device is operable to cause storage of the provisioning data 244b and/or retrieval of the same, as appropriate. Advantageously, in certain embodiments, the storage of the provisioning data 244b on the HVAC controller 220 eliminates a need for separate sharing of provisioning data similar to the provisioning data 244b among users or devices, such that any access device similar to the access device 232 can serve as either a provisioning device or a servicing device.

For illustrative purposes, various operations that can occur during the processes 300, 400 and 500 of FIGS. 3, 4, and 5, respectively, are described in particular ways and in particular orders. It should be appreciated, however, that these operations need not occur in the way or order described and, in many cases, some operations can be selectively omitted. By way of simple example, the blocks 302 and 304 of FIG. 3, which relate to receipt of user instructions to initiate pairing, can occur in any particular order in various implementations. By way of further example, as described previously, the process 300 of FIG. 3 can be performed, in whole or in part, as all or part of the blocks 406 and 504, respectively, of FIGS. 4 and 5. In such cases, it should be appreciated that user instructions to initiate meshnet provisioning or meshnet servicing according to blocks 402 and 502, respectively, can, but need not, be separate from instructions to initiate pairing, for example, according to the block 302 of FIG. 3. Other variations and modifications will be apparent to one skilled in the art after a detailed review of the present disclosure.

Although various examples are described above relative to controllers of an HVAC system, such as a controller of a rooftop or package unit, it should be appreciated that these examples are merely illustrative. In various embodiments, the principles of the present disclosure are similarly applicable to other types of systems and components that may be permanently or semi-permanently positioned in proximity to an enclosed space such as the enclosed space 101a of FIG. 1, or subject to on-premises installation. For example, similar principles can be applied to lighting systems, security systems and/or other systems or components that may perform or benefit from meshnet provisioning or servicing.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While re above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a provisioning device:
   receiving a user instruction to initiate meshnet provisioning;
   provisioning a first device to a meshnet, wherein the provisioning the first device yields first provisioning data comprising one or more keys;
   provisioning a second device to the meshnet, wherein the provisioning the second device yields second provisioning data comprising one or more keys; and
   connecting the provisioning device to the first device via a first communication protocol;
   transferring provisioning data comprising the first provisioning data and the second provisioning data to storage on the first device;
   the method further comprising, by a servicing device:
   receiving a user instruction to service the meshnet;
   connecting to the first device via the first communication protocol;
   requesting the provisioning data from the first device;
   receiving the provisioning data responsive to the requesting; and
   servicing the meshnet using the provisioning data.

2. The method of claim 1, wherein the first device communicates in the meshnet via a wireless protocol different from the first communication protocol.

3. The method of claim 2, wherein the provisioning the second device is performed before the provisioning the first device.

4. The method of claim 1, comprising the servicing device transferring updated provisioning data to the storage on the first device.

5. The method of claim 1, wherein the provisioning device and the servicing device are different devices.

6. The method of claim 1, wherein:
   the first device comprises a controller of a heating, ventilation and air conditioning (HVAC) system; and
   the second device comprises at least one environment sensor used in the HVAC system.

7. The method of claim 6, wherein the second device comprises a relay node used in the HVAC system.

8. A method comprising, by a servicing device:
   receiving a user instruction to service a meshnet comprising a plurality of provisioned devices;
   connecting to a first device of the plurality of provisioned devices via a first communication protocol, wherein the first device communicates in the meshnet via a wireless protocol different from the first communication protocol;
   requesting provisioning data from the first device;
   receiving the provisioning data from the first device responsive to the requesting, the provisioning data comprising one or more keys; and
   servicing the meshnet using the provisioning data.

9. The method of claim 8, wherein the connecting comprises the servicing device pairing with the first device.

10. The method of claim 8, comprising the servicing device transferring updated provisioning data to storage on the first device.

11. The method of claim 8, wherein:
    the first device comprises a controller of a heating, ventilation and air conditioning (HVAC) system; and
    the plurality of provisioned devices comprises at least one environment sensor used in the HVAC system.

12. The method of claim 11, wherein the plurality of provisioned devices comprises a relay node used in the HVAC system.

13. A computer-program product comprising a non-transitory computer-usable medium having computer-readable program code embodied therein, the computer-readable program code adapted to be executed to implement a method comprising, by a provisioning device:
    receiving a user instruction to initiate meshnet provisioning;
    provisioning a first device to a meshnet, wherein the provisioning the first device yields first provisioning data comprising one or more keys;
    provisioning a second device to the meshnet, wherein the provisioning the second device yields second provisioning data comprising one or more keys; and
    connecting the provisioning device to the first device via a first communication protocol;
    transferring provisioning data comprising the first provisioning data and the second provisioning data to storage on the first device;
    the method further comprising, by a servicing device:
    receiving a user instruction to service the meshnet;
    connecting to the first device via the first communication protocol;
    requesting the provisioning data from the first device;
    receiving the provisioning data responsive to the requesting; and
    servicing the meshnet using the provisioning data.

14. The computer-program product of claim 13, wherein the first device communicates in the meshnet via a wireless protocol different from the first communication protocol.

15. The computer-program product of claim 14, wherein the provisioning the second device is performed before the provisioning the first device.

16. The computer-program product of claim 13, the method comprising the servicing device transferring updated provisioning data to the storage on the first device.

17. The computer-program product of claim 13, wherein the provisioning device and the servicing device are different devices.

18. The computer-program product of claim 13, wherein:
    the first device comprises a controller of a heating, ventilation and air conditioning (HVAC) system; and
    the second device comprises at least one environment sensor used in the HVAC system.

* * * * *

UNITED STATES PATENT AND TRADEMARK OFFICE
CERTIFICATE OF CORRECTION

PATENT NO. : 11,297,504 B2  
APPLICATION NO. : 16/865513  
DATED : April 5, 2022  
INVENTOR(S) : Elena Smirnova et al.

It is certified that error appears in the above-identified patent and that said Letters Patent is hereby corrected as shown below:

In the Specification

| | |
|---|---|
| Column 2, Line 34 | Replace "provision and" with --provisioning; and-- |
| Column 5, Line 28 | Replace "interconnect" with --Interconnect-- |
| Column 6, Line 4 | Replace "controller 720" with --controller 220-- |
| Column 9, Line 52 | Replace "to Direct." with --to Wi-Fi Direct.-- |
| Column 10, Lines 6-7 | Replace "access device 732" with --access device 232-- |

Signed and Sealed this  
Twenty-seventh Day of June, 2023

Katherine Kelly Vidal  
*Director of the United States Patent and Trademark Office*